(12) United States Patent
Krishnaswamy et al.

(10) Patent No.: US 7,885,939 B2
(45) Date of Patent: *Feb. 8, 2011

(54) LONGEST QUERY DURATION FOR AUTO TUNING UNDO RETENTION

(75) Inventors: Vasudha Krishnaswamy, Fremont, CA (US); Dheeraj Pandey, Santa Clara, CA (US); Bipul Sinha, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 11/249,150

(22) Filed: Oct. 11, 2005

(65) Prior Publication Data

US 2007/0083566 A1    Apr. 12, 2007

(51) Int. Cl.
*G06F 7/00*    (2006.01)
(52) U.S. Cl. ...................... 707/684; 707/662
(58) Field of Classification Search ................ 707/101, 707/200, 2, 204, 3, 684, 662; 711/170, 120
See application file for complete search history.

(56) References Cited

U.S. PATENT DOCUMENTS

| | | | |
|---|---|---|---|
| 4,674,039 A | 6/1987 | Chouery | |
| 5,129,070 A | 7/1992 | Dorotte | |
| 5,761,672 A | 6/1998 | Samuelsson et al. | |
| 5,890,000 A | 3/1999 | Aizikowitz et al. | |
| 5,907,848 A | 5/1999 | Zaiken et al. | |
| 6,185,577 B1 | 2/2001 | Nainani et al. | |
| 6,192,377 B1 | 2/2001 | Ganesh et al. | |
| 6,272,612 B1 | 8/2001 | Bordaz et al. | |
| 6,574,717 B1 | 6/2003 | Ngai et al. | |
| 6,587,847 B1 | 7/2003 | Stier et al. | |
| 6,591,298 B1 | 7/2003 | Spicer et al. | |
| 6,631,374 B1 | 10/2003 | Klein et al. | |
| 6,694,340 B1 * | 2/2004 | Lyle et al. | 707/204 |
| 6,976,022 B2 | 12/2005 | Vemuri et al. | |
| 6,981,004 B2 | 12/2005 | Ganesh et al. | |
| 7,035,990 B1 | 4/2006 | Muhlbauer | |

(Continued)

OTHER PUBLICATIONS

Burke, M. "An Interval-Based Approach to Exhaustive and Incremental Interprocedural Data-Flow Analysis" ACM Transactions on Programming Languages and Systems, Jul. 1990, vol. 12, No. 3, pp. 341-395.

(Continued)

*Primary Examiner*—Shahid A Alam
*Assistant Examiner*—Donald Lawson
(74) *Attorney, Agent, or Firm*—Vista IP Law Group, LLP.

(57) ABSTRACT

Methods and systems for automatically tuning the undo retention in a database system are disclosed. The undo tablespace may be of a fixed size or may be set to be automatically extended. If the undo tablespace is of a fixed size, the undo retention is set to a "best possible" undo retention, which is calculated based on statistical data stored in the system. If the undo tablespace is configured to be automatically extensible, the undo retention may be set to be greater than the duration of the longest running query in the system. The duration of the longest running query may be calculated in a distributed process in which each instance broadcasts information about its longest running query to other instances.

16 Claims, 7 Drawing Sheets

U.S. PATENT DOCUMENTS

| | | | |
|---|---|---|---|
| 7,047,386 B1 * | 5/2006 | Ngai et al. | 711/170 |
| 7,110,998 B1 | 9/2006 | Bhandari et al. | |
| 7,127,456 B1 | 10/2006 | Brown et al. | |
| 7,305,422 B1 | 12/2007 | Wang | |
| 2002/0091694 A1 | 7/2002 | Hrle et al. | |
| 2004/0054643 A1 | 3/2004 | Vemuri et al. | |
| 2004/0054644 A1 | 3/2004 | Ganesh et al. | |
| 2005/0015563 A1 | 1/2005 | Yang et al. | |
| 2005/0114409 A1 | 5/2005 | Sinha et al. | |
| 2005/0120062 A1 | 6/2005 | Sinha et al. | |
| 2005/0120064 A1 | 6/2005 | Sinha et al. | |
| 2005/0125430 A1 | 6/2005 | Souder et al. | |
| 2005/0131966 A1 | 6/2005 | Lou | |
| 2005/0182658 A1 | 8/2005 | Abraham-Fuchs et al. | |
| 2005/0240633 A1 | 10/2005 | Krishnaswamy et al. | |
| 2005/0256829 A1 | 11/2005 | Yang et al. | |
| 2005/0256849 A1 * | 11/2005 | Krishnaswamy et al. | 707/3 |
| 2007/0083488 A1 | 4/2007 | Krishnaswamy | |
| 2007/0083566 A1 | 4/2007 | Krishnaswamy et al. | |

OTHER PUBLICATIONS

Chin, R.S. et al. "Distributed Object-Based Programming Systems" ACM Computing Surveys, Mar. 1991, vol. 23, No. 1, pp. 91-124.

Chiueh, T. et al. "Zodiac: A History-Based Interactive Video Authoring System" Proceedings of the 6th ACM International Conference on Multimedia (Multimedia '98), Bristol, UK, Sep. 1998, pp. 435-443.

Hudson, S.E. et al. "Object-Oriented Database Support for Software Environments" Proceedings of the 1987 ACM SIGMOD International Conference on Management of Data (SIGMOD '87), San Francisco, CA, May 27-29, 1987, vol. 16, No. 3, pp. 491-503.

Kunz, T. et al. "Fast Detection of Communication Patterns in Distributed Executions" Proceedings of the 1997 Conference of the Centre for Advanced Studies on Collaborative Research, Nov. 1997, pp. 1-13.

Leehane, T. "Level II Technical Support in a Distributed Computing Environment" Proceedings of the 24th Annual ACM SIGUCCS Conference on User Services, Sep. 1996, pp. 95-99.

Lomet, D.B. "MLR: A Recovery Method for Multi-level Systems" Proceedings of the 1992 ACM SIGMOD International Conference on Management of Data (SIGMOD '92), San Diego, CA, Jun. 2-5, 1992, vol. 21, No. 2, pp. 185-194.

Randell, B. et al. "Reliability Issues in Computing System Design" ACM Computing Surveys, Jun. 1978, vol. 10, No. 2, pp. 123-165.

Santry, D.S. et al. "Deciding when to forget in the Elephant file system" Proceedings of the 17th ACM Symposium on Operating Systems Principles (SOSP '99), Kiawah Island, SC, Dec. 1999, vol. 33, No. 5, pp. 110-123.

Soares, P.G. "On Remote Procedure Call" Proceedings of the 1992 Conference of the Centre for Advanced Studies on Collaborative Research, Nov. 1992, vol. 2, pp. 215-267.

Thatte, S.M. "Persistent Memory: A Storage Architecture for Object-Oriented Database Systems" Proceedings on the 1986 International Workshop on Object-Oriented Database Systems, Sep. 1986, pp. 148-159.

Office Action dated Nov. 2, 2006 for U.S. Appl. No. 10/846,099.
Office Action dated Jul. 16, 2007 for U.S. Appl. No. 10/846,099.
Office Action dated Mar. 25, 2008 for U.S. Appl. No. 10/846,099.
Office Action dated Oct. 1, 2008 for U.S. Appl. No. 10/846,099.
Office Action dated Oct. 31, 2006 for U.S. Appl. No. 10/846,095.
Office Action dated May 16, 2008 for U.S. Appl. No. 10/846,095.
Office Action dated Dec. 23, 2008 for U.S. Appl. No. 10/846,095.
Office Action dated Dec. 13, 2007 for U.S. Appl. No. 11/249,149.
Office Action dated Jun. 9, 2008 for U.S. Appl. No. 11/249,149.
Office Action dated Dec. 24, 2008 for U.S. Appl. No. 11/249,149.
Final Office Action dated Dec. 4, 2009 for U.S. Appl. No. 10/846,095.
Non Final Office Action dated Jun. 8, 2009 for U.S. Appl. No. 10/846,095.
Non Final Office Action dated Jan. 5, 2010 for U.S. Appl. No. 11/249,149.
Final Office Action dated Jun. 10, 2009 for U.S. Appl. No. 11/249,149.
Notice of Allowance dated May 21, 2010 for U.S. Appl. No. 11/249,149.

* cited by examiner

LONGEST QUERY DURATION FOR AUTO TUNING UNDO RETENTION

RELATED APPLICATION

This application is related to co-pending U.S. application Ser. No. 10/846,099, filed on May 13, 2004, entitled "Automatic Tuning of Undo Retention," and co-pending U.S. application Ser. No. 11/249,149, entitled "Undo Hints to Speed Up Segment Extension and Tuning of Undo Retention", filed on even date herewith, both of which are hereby incorporated by reference in their entireties.

FIELD

Embodiments of the invention relate to computer systems, and more particularly to data recovery.

BACKGROUND OF THE INVENTION

In database systems, a "transaction" refers to an atomic set of operations performed against a database, which may access, create, modify or delete database data or metadata. A "commit" occurs when the transaction has completed its processing and any changes to the database by the transaction are ready to be permanently implemented in the database system.

Transaction log records can be maintained in a database system to allow data recovery in the event of an error, that may include hardware failure, network failure, process failure, database instance failure, data access conflicts, user errors, and statement failures in database access programs.

Various types of transaction log records can be maintained in a database system for data recovery. One type of log record that may be maintained is the "undo" record. Undo records contain information about changes that were introduced into the database system. For example, if a row in a table were modified, the changes will be stored in the undo record identifying the block of the database system that includes the modified table row.

Memory or disk space needs to be allocated for storage of undo records. Database managers usually set the undo tablespace size by predicting how many undo records may be generated. Often there is not enough statistical information available for database administrators to use in order to arrive at an accurate prediction of undo records generation. Incorrect undo tablespace size may cause errors in the system, as not enough undo records may be available. Alternatively, allocating too much memory or disk space for storing undo records is inefficient.

Moreover, database administrators need to predict how long undo records should be maintained, a parameter known as the "undo retention." Users may require older versions of the data for various reasons. In order to prevent these users from obtaining error messages, undo records should be maintained in the system to allow the data to be retained to their previous values. However, undo tablespace is limited, and new transactions require undo tablespace. A user may therefore monitor the system activity and adjust the undo retention based on the amount of undo information generated by new transactions.

However, database system activity levels may fluctuate; for example, activity levels may be higher during regular business hours than at night. Adjusting the parameters to the fluctuation system activity may therefore require a user to constantly monitor system activity and change the parameters as needed.

What is needed, therefore, is a solution that overcomes these and other shortcomings of the prior art.

SUMMARY OF THE INVENTION

Methods and apparatuses for data recovery are described. Embodiments of the invention include improved methods for tracking the longest running query executing in a database system, for calculating the best possible retention time, and for automatically tuning the undo retention time. The undo retention time may be automatically tuned, for example, to support the longest running query, or to the best possible retention time.

BRIEF DESCRIPTION OF THE DRAWINGS

The invention is illustrated by way of example and not limitation in the figures of the accompanying drawings, in which like references indicate similar elements and in which.

DETAILED DESCRIPTION

Methods and apparatuses for data recovery are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

Auto Tuning of Undo Retention

Figure 1:
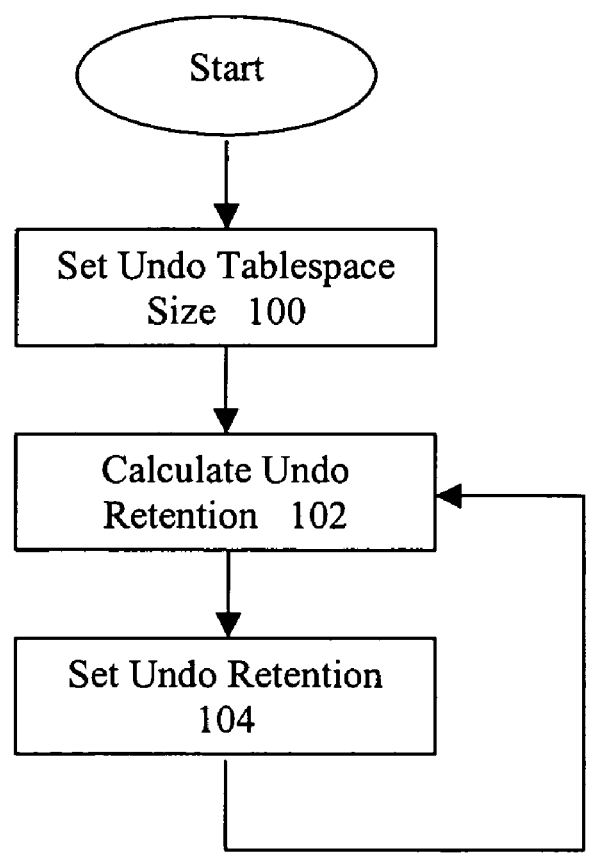
FIG. 1 is a flow chart illustrating a method for auto tuning the undo retention, in accordance with an embodiment of the present invention.

FIG. 1 is a flow chart illustrating a method for auto tuning the undo retention. As shown in FIG. 1, the method may begin in step 100, wherein the undo tablespace size may be set. The undo tablespace size may be set, for example, by a user. The undo tablespace size may be determined, for example, based on the available memory, the system activity, and the needs of other applications running on the system. In one implementation, a user may choose whether to set the undo tablespace size to a fixed size, or to allow the system to automatically increase the undo tablespace size when needed. Allowing the system to automatically increase the undo tablespace size may be known as setting auto-extension on. If the user elects to turn auto-extension on, the user may specify an initial undo tablespace size or allow the undo tablespace size to be set to a default undo tablespace size. Similarly, the user may specify a maximum undo tablespace size, may allow the maximum tablespace size to be set to a default tablespace size, or may allow the tablespace size to increase to the limit of the system. The undo tablespace may be automatically increased by the system when it is determined that more undo tablespace is needed, and there is available space on disk to grow the file used for undo tablespace.

The method may continue in step 102, wherein an undo retention may be calculated. The calculation of the undo retention will be discussed further with reference to FIGS. 2-6.

In step 104, the undo retention may be set to the calculated rate. The method may return to step 102.

Fixed Size Undo Tables and Auto Extension of Undo Tables

Figure 2:
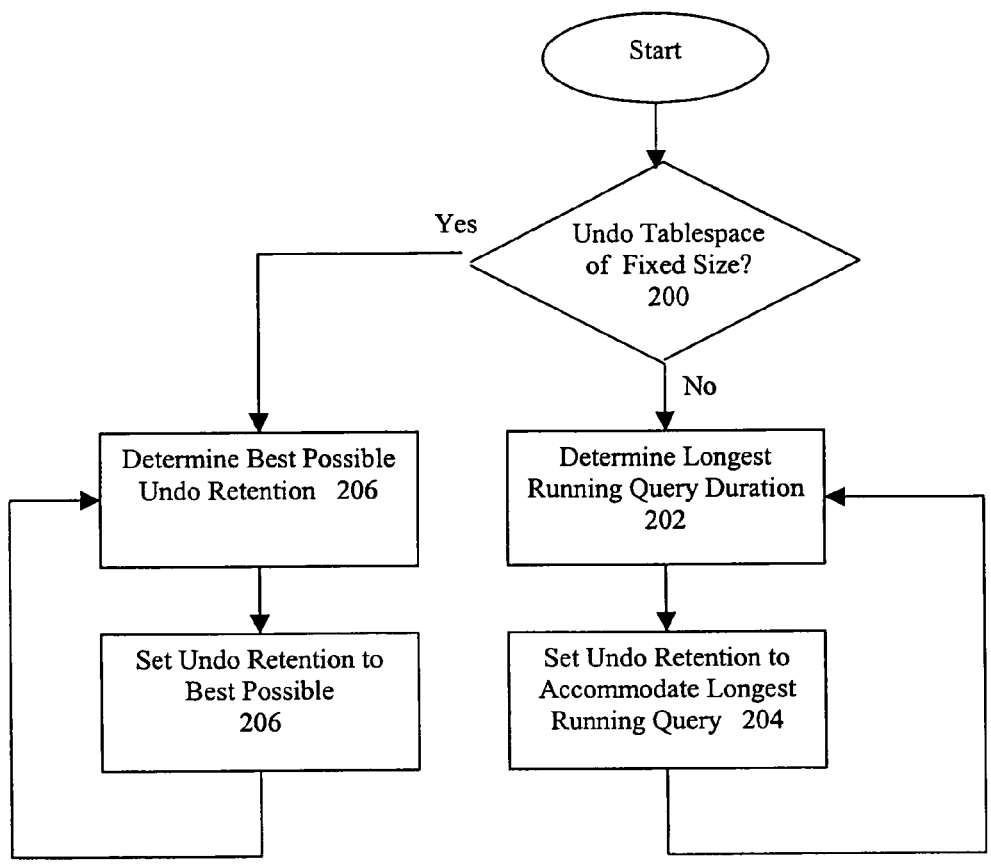
FIG. 2 is a flow chart illustrating a method for auto tuning the undo retention, in accordance with and embodiment of the present invention.

FIG. 2 is a flow chart illustrating a method for auto tuning the undo retention. As shown in FIG. 2, the method may begin in step 200, wherein it may be determined whether the undo tablespace is of fixed size, or whether auto-extension is on.

If the undo tablespace is not of a fixed size, that is, if auto-extension is on, the method may continue in step 202, wherein the longest running query duration may be determined. In step 204, the undo retention may be set to accommodate the longest running query. This may include, for example, setting the undo retention to be equal to the length of the longest running query, plus a buffer period. Determining the longest running query and setting the undo retention to accommodate the longest running query will be discussed further with reference to FIGS. 3-4. The method may then return to step 202.

If the undo tablespace is of a fixed size, the method may continue in step 206, wherein the best possible undo retention may be determined. In step 208, the undo retention may be set to the best possible undo retention. This may include, for example, accessing statistics to determine the system activity, and setting the undo retention such that a particular percentage of the undo tablespace will be in use if system activity continues at its current rate. Determining the best possible undo retention and setting the undo retention to the best possible undo retention will be discussed further with reference to FIGS. 5-6. The method may then return to step 206.

In normal system operation, the longest query duration is usually shorter than the best possible undo retention. The longer the undo retention, the further back data recovery can be performed. Thus, in order to allow a user to recover from any errors or-to perform a "flashback" operation to view an older version of the database, the best possible undo retention should be offered.

However, if auto-extension is set on, there may be undesirable consequences to setting the undo retention to the best possible undo retention. For example, the size of the undo tablespace may be repeatedly extended to allow for greater undo retention, diverting resources from other processes.

For these reasons, the undo retention may not be set to the best possible undo retention in systems where auto-extension has been turned on. Rather, the undo retention may be set to accommodate the longest running query.

Longest Query Duration

In the case where auto-extension has been turned on, the undo retention may be auto tuned to support the longest query that is currently running. Auto tuning the retention for a system in which auto-extension has been turned on will be discussed with reference to FIGS. 3-4.

Figure 3:
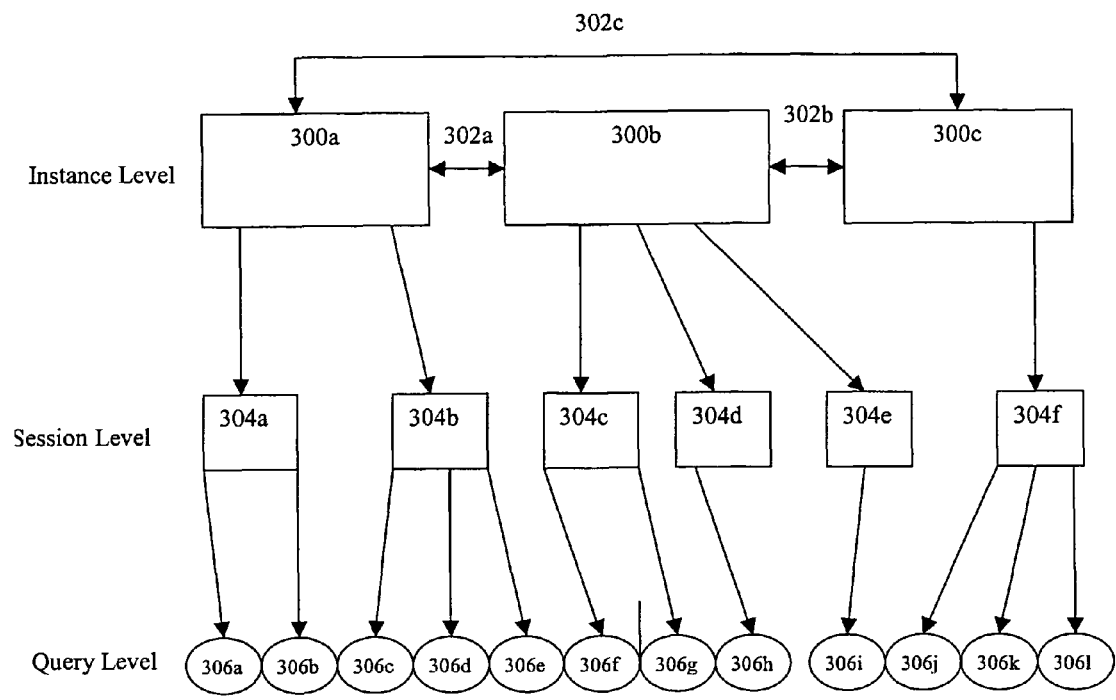
FIG. 3 is a block diagram illustrating a database system architecture, in accordance with an embodiment of the present invention.

FIG. 3 is a block diagram illustrating a database system architecture. As shown in FIG. 3, a database system may include a plurality of instances 300a-c, which may be nodes in a database system. The instances 300a-c may be in communication via connections 302a-c.

Each of the instances 300a-c may contain one or more sessions, or user connections, 304a-f. Each user connection may contain one or more operations 306a-l. The operations 306a-l may include not only queries, but also other operations, such as merge operations, sort operations, hybrid operations containing a combination of queries, merges, and sorts, or any other type of operation.

Figure 4:
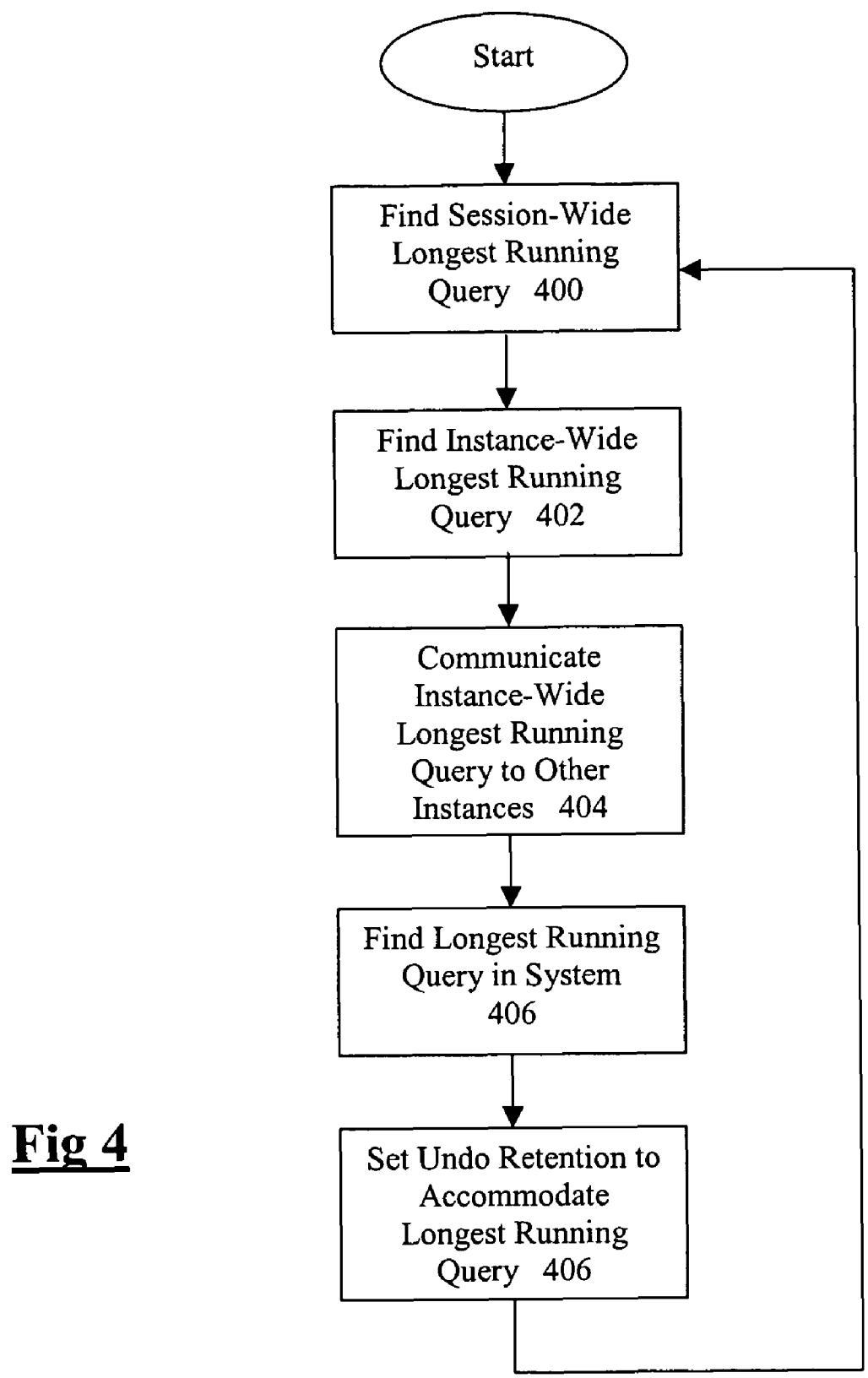
FIG. 4 is a flow chart illustrating a method for calculating the longest query duration, in accordance with an embodiment of the present invention.

FIG. 4 is a flow chart illustrating a method for calculating the longest query duration. Although the term "query" is used throughout, the method of FIG. 4 may be used not only to find the longest query, but to find the longest-running operation 306a-q, be it a query, merge operation, sort operation, or hybrid operation including some combination of queries, merge operations, and sort operations. Thus, the method of FIG. 4 can be used to ensure that long running operations will be supported by the present invention, regardless of the type of operation.

As shown in FIG. 4, the method may begin in step 400, wherein the longest running query for each session is identified. Identifying the longest running query for each session may include, for example, a process in the foreground of each session iterating over all open cursors in the current session. For each open cursor, the foreground process may compute the elapsed time based on the start time of the cursor and the current time. For each open cursor, the foreground process may store the elapsed time and the time at which the computation was performed. In order to find the longest running query for the session, each query may be compared based on the elapsed time and the time of computation. In comparing these and subsequent queries, it may be assumed that all queries have continued to run since the time of computation. Thus, in performing comparisons, the duration of each query may be considered to be:

query duration=current time−time of computation+elapsed time.

Storing not only the elapsed time, but also the time of computation, allows for queries to be compared across a database system as information is propagated throughout the system. Thus, storing the time of computation allows for the duration of the longest running query to be accurately computed by compensating for any latency.

In one implementation, rather than computing the elapsed time and time of computation, the start time for each query is stored. The start times of various queries may then be compared to determine which is the longest running query. Such a system would be particularly well-adapted to a system which lies entirely in one time zone. However, in distributed systems in which various portions of the system lie in different time zones, precautions may need to be taken to ensure that the computations are accurate. Computing the elapsed time and time of computation rather than simply storing the start time may therefore be implemented in such distributed systems.

In step 402, the longest running query for each instance may be identified. For example, each instance may receive the longest query duration and time of computation for each session in the instance. The instance may then perform an iterative process similar to the process performed at the session level.

In step 404, each instance may communicate the instance-wide longest query duration and time of computation to the other instances in the system. In step 406, each instance may perform a separate calculation to determine the longest query duration in the system. This calculation may be similar to the calculations performed in steps 400 and 402.

In step 406, the undo retention time may be set to support the longest running query. This may include, for example, setting the undo retention time to be longer than the longest running query duration. In one implementation, the undo retention time may be set to be the longest running query duration, plus a fixed buffer. In another implementation, the undo retention time may be set to be a fixed percentage above the longest query duration. For example, the undo retention time may be set to be 120% of the undo retention time, 150% of the longest query duration, or another appropriate time. In yet another implementation, user preferences may be used to auto tune the undo retention time. Other implementations are possible.

In one implementation, the best possible retention is calculated in addition to the longest query duration. In the case where the longest query duration is longer than the best possible retention, the undo retention time may be set to the best possible retention rather than to being set to support the longest query duration. Methods for calculating the best possible retention will be discussed with reference to FIG. 5-6.

Because the undo retention time is always set to be longer than the longest query duration, and because the undo retention time is calculated routinely, the undo retention time will remain ahead of the longest running query. Thus, as the duration of the query increases, the undo retention time will also increase, ensuring that the query is supported.

Best Possible Undo Retention

If the undo tablespace is of a fixed size, the undo retention may be auto tuned to the best possible undo retention for the current size of the undo table. Auto tuning the retention for auto extension will be discussed with reference to FIGS. 5-6.

Figure 5:
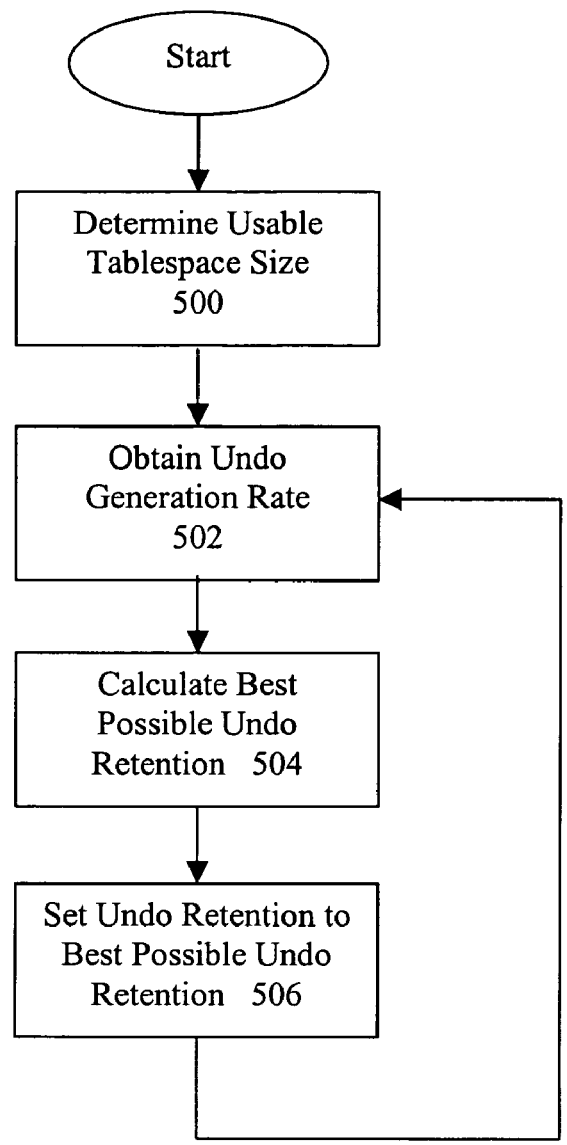
FIG. 5 is a flow chart illustrating a method for calculating the best possible undo retention, in accordance with an embodiment of the invention.

FIG. 5 is a flow chart illustrating a method for calculating the best possible undo retention. In one implementation, the method of FIG. 5 may be performed for a fixed size tablespace, and the undo retention may be set to the best possible undo retention. In another implementation, the method of FIG. 5 may be performed for a system in which auto-extension is on. If auto-extension is on, both the longest query duration and the best possible retention may be calculated, and the undo retention will be set to the minimum of the two. In another implementation, an undo retention parameter may be set by a user. In this implementation, the undo retention provided by the system may set to:

min(best possible retention,max(longest query duration,undo retention parameter)).

Other implementations will occur to those skilled in the art.

As shown in FIG. 5, the method may begin in step 500, wherein the usable tablespace size may be determined. In order to allow for fluctuations in system activity, the undo retention should not be configured so that the entire undo tablespace will likely be in use. Rather, the undo retention should be configured such that a portion of the undo tablespace will likely be used, and a buffer region of unused undo tablespace will likely remain. Thus, the usable tablespace size may not be set to the full size of the undo table.

In one implementation, users may configure the usable tablespace size. In another implementation, the usable tablespace size is calculated, for example, based on pre-existing user preferences. In one implementation, user settings include a warning threshold for the undo tablespace, at which a first alert will be presented to the user, and a critical threshold for the undo tablespace, at which a second alert will be presented to the user. For example, a user may configure these settings such that a first alert will be presented when the undo tablespace is 65% full, and a second alert will be provided to the user when the undo tablespace is 85% full. Other settings are possible.

In one implementation, the usable tablespace size is calculated based on the warning threshold, the critical threshold, and a default. For example, if the default, warning threshold, and critical threshold are specified as percentages, the usable tablespace may be calculated according to the following formula:

usable tablespace=(min(default,warning threshold, critical threshold))×undo tablespace size.

Other methods for calculating usable tablespace will occur to those skilled in the art.

If the undo tablespace is of a fixed size, the size of the undo tablespace may be used to calculate the usable tablespace size. If the undo tablespace is not of a fixed size, that is, if auto-extension is on, the maximum size of the undo tablespace may be used to calculate the usable tablespace size. If no maximum size has been specified, the current size of the undo tablespace may be used to calculate the usable tablespace size.

In step 502, an undo generation rate may be obtained. The undo generation rate may be, for example, a parameter indicating how much undo tablespace is used in a given period of time. The undo generation rate may be calculated, for example, based on statistical information stored in the system.

In one implementation, a user may define a time period to be used in calculating the undo generation rate. For example, if the user feels that upcoming system activity will be similar to the system activity over the last 3 days, the user may specify that statistics for the last 3 days be considered in calculation the undo generation rate. For example, the system may determine that over the last 3 days, undo records were generated at the average rate of 125 MB/hour.

In step 504, the best possible undo retention may be calculated. In one implementation, the best possible undo retention may be calculated according to the formula:

best possible undo retention=(usable tablespace size)/(undo generation rate).

Other calculations for the best possible undo retention are possible.

In step 506, the undo retention may be set to the best possible undo retention. The method may then return to step 502.

Figure 6:
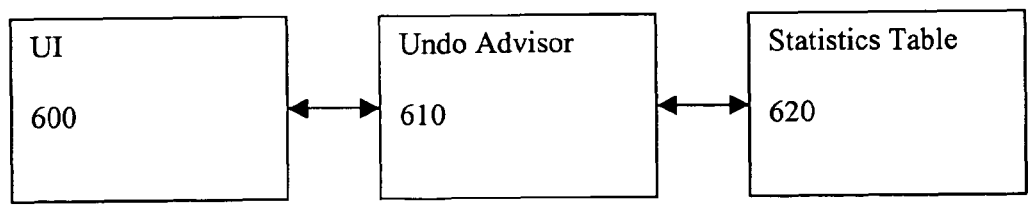
FIG. 6 is a block diagram illustrating a system in accordance with an embodiment of the invention.
Figure 7:
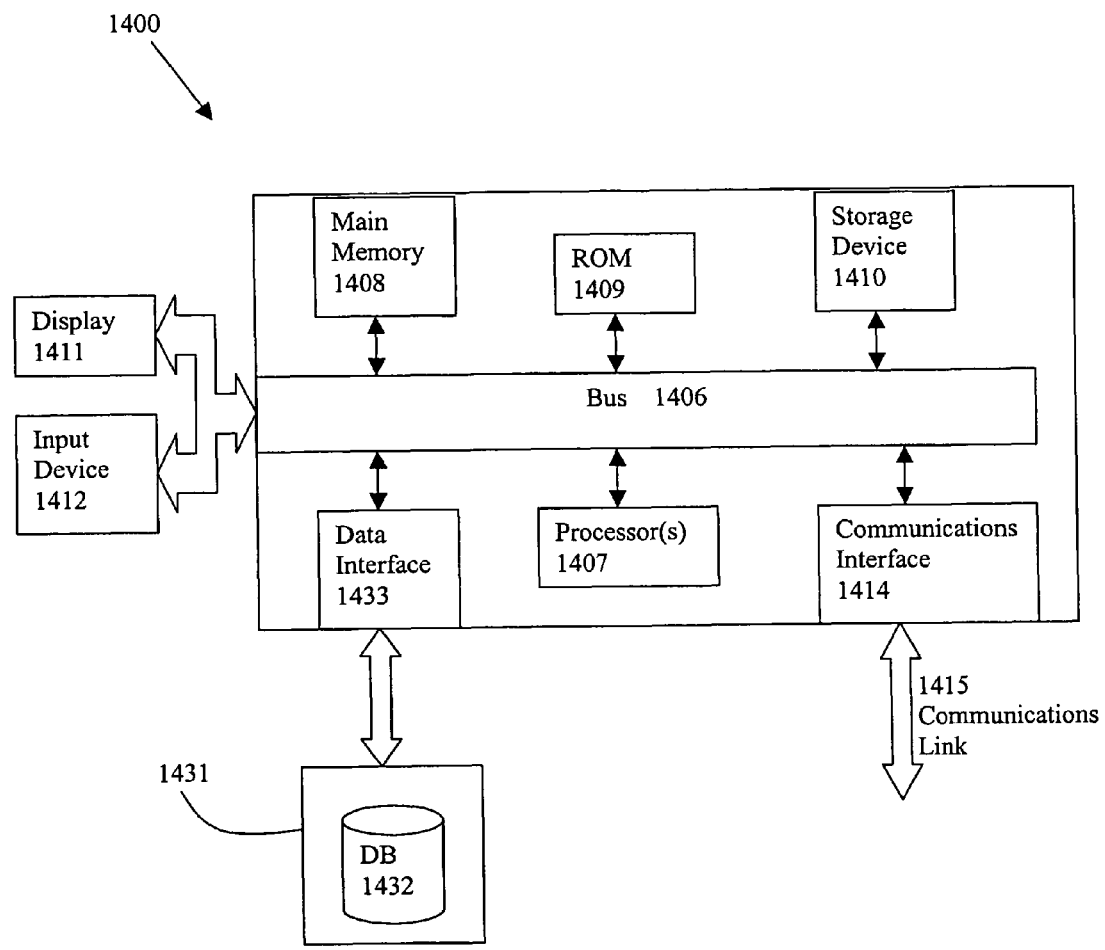
FIG. 7 illustrates a processing system in which embodiments of the invention may be practiced.

As shown in FIG. 6, in one embodiment of the invention, a user of a database system inputs preferences and settings, and receives information about a database system, via a user interface 600. An undo advisor 610, utilizing a statistics table 620, may auto tune the undo retention time. In another implementation, the undo advisor 610 may provide recommendations for the undo retention time to the user via the user interface 600, and the user may manually adjust the undo retention time. In yet another implementation, the undo advisor 610 may also be used to auto extend the undo tablespace size.

The statistics table 620 may includes information about used undo records, the longest running query duration, and other appropriate information.

System Architecture Overview

The execution of the sequences of instructions required to practice the invention may be performed in embodiments of the invention by a computer system 1400 as shown in FIG. 6. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 Will be presented below; however, it should be understood that any number of computer systems 1400 may be employed to practice the invention.

A computer system 1400 according to an embodiment of the invention will now be described with reference to FIG. 6, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that cannot retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer-implemented method for calculating an undo retention in a database system, comprising:
   tracking at least one operation executing in the database system;
   selecting, by using a processor, a first instance-wide longest running operation from among tracked operations;
   broadcasting first information describing the first instance-wide longest running operation to other instances in the database system, wherein the act of broadcasting comprises communicating the first information to the other instances in the database system such that a system-wide longest running operation is obtained based at least in part upon the first information describing the first instance-wide longest running operation propagated to the other instances and other information describing one or more other instance-wide longest running operations propagated from the other instances through the database system;

receiving second information describing a second instance-wide longest running operation;

selecting either the first instance-wide longest running operation or the second instance-wide longest running operation as the system-wide longest running operation;

calculating an undo retention for supporting the system-wide longest running operation; and storing the first information in a volatile or non-volatile computer-usable medium or displaying the first information on a display device.

2. The method of claim 1, further comprising:
electronically setting a system undo retention to the calculated undo retention.

3. The method of claim 1, wherein tracking at least one operation executing in a database system comprises:
for each session, tracking all open cursors and selecting the longest running operation as a session-wide longest operation.

4. The method of claim 1, wherein selecting a first instance-wide longest running operation comprises:
from among one or more session-wide longest running operations, selecting the longest running operation as the first instance-wide longest running operation.

5. The method of claim 1, wherein the second information is received from another instance in the system.

6. The method of claim 1, wherein calculating an undo retention for supporting the system-wide longest running operation comprises:
calculating an undo retention that is longer than the duration of the system-wide longest running operation.

7. A computer program product comprising a volatile or non-volatile computer usable storage medium having executable code to execute a process, by using a processor, for calculating an undo retention in a database system, the process comprising:

tracking at least one operation executing in the database system;

selecting a first instance-wide longest running operation from among tracked operations;

broadcasting first information describing the first instance-wide longest running operation to other instances in the database system, wherein the act of broadcasting comprises communicating the first information to the other instances in the database system such that a system-wide longest running operation is obtained based at least in part upon the first information describing the first instance-wide longest running operation propagated to the other instances and other information describing one or more other instance-wide longest running operations propagated from the other instances through the database system;

receiving second information describing a second instance-wide longest running operation, wherein the second information is received from another instance in the system;

selecting either the first instance-wide longest running operation or the second instance-wide longest running operation as the system-wide longest running operation;

calculating an undo retention for supporting the system-wide longest running operation; and storing the first information or displaying the first information on a display device.

8. A system for calculating an undo retention in a database system, comprising:
a processor programmed for:
tracking at least one operation executing in the database system;

selecting a first instance-wide longest running operation from among tracked operations;

broadcasting first information describing the first instance-wide longest running operation to other instances in the database system, wherein the act of broadcasting comprises communicating the first information to the other instances in the database system such that a system-wide longest running operation is obtained based at least in part upon the first information describing the first instance-wide longest running operation propagated to the other instances and other information describing one or more other instance-wide longest running operations propagated from the other instances through the database system;

receiving second information describing a second instance-wide longest running operation, wherein the second information is received from another instance in the system;

selecting either the first instance-wide longest running operation or the second instance-wide longest running operation as the system-wide longest running operation;

calculating an undo retention for supporting the system-wide longest running operation; and a volatile or non-volatile computer-usable storage medium for storing the first information or a display device for displaying the first information.

9. The product of claim 7, further comprising:
electronically setting a system undo retention to the calculated undo retention.

10. The product of claim 7, wherein tracking at least one operation executing in a database system comprises:
for each session, tracking all open cursors and selecting the longest running operation as a session-wide longest operation.

11. The product of claim 7, wherein selecting a first instance-wide longest running operation comprises:
from among one or more session-wide longest running operations, selecting the longest running operation as the first instance-wide longest running operation.

12. The product of claim 7, wherein calculating an undo retention for supporting the system-wide longest running operation comprises:
calculating an undo retention that is longer than the duration of the system-wide longest running operation.

13. The system of claim 8, wherein the processor is further programmed for:
electronically setting a system undo retention to the calculated undo retention.

14. The system of claim 8, wherein tracking at least one operation executing in a database system comprises:
tracking all open cursors and selecting the longest running operation as a session-wide longest operation.

15. The system of claim 8, wherein selecting a first instance-wide longest running operation comprises:
selecting the longest running operation as the first instance-wide longest running operation from among one or more session-wide longest running operations.

16. The system of claim 8, wherein calculating an undo retention for supporting the system-wide longest running operation comprises:
calculating an undo retention that is longer than the duration of the system-wide longest running operation.

* * * * *

UNITED STATES PATENT AND TRADEMARK OFFICE
CERTIFICATE OF CORRECTION

| | | |
|---|---|---|
| PATENT NO. | : 7,885,939 B2 | Page 1 of 1 |
| APPLICATION NO. | : 11/249150 | |
| DATED | : February 8, 2011 | |
| INVENTOR(S) | : Krishnaswamy et al. | |

It is certified that error appears in the above-identified patent and that said Letters Patent is hereby corrected as shown below:

In column 3, line 47, delete "or-to" and insert -- or to --, therefor.

In column 7, line 10, delete "Will" and insert -- will --, therefor.

Signed and Sealed this
Twentieth Day of September, 2011

David J. Kappos
*Director of the United States Patent and Trademark Office*